(12) United States Patent
Clos et al.

(10) Patent No.: US 10,220,868 B1
(45) Date of Patent: Mar. 5, 2019

(54) DOLLY WITH EXTENDABLE WHEEL ASSEMBLIES

(71) Applicant: The Boeing Company, Chicago, IL (US)

(72) Inventors: William Robert Clos, Mukilteo, WA (US); Douglas Alan Brown, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/927,912

(22) Filed: Mar. 21, 2018

(51) Int. Cl.
| *B62B 3/02* | (2006.01) |
| *B62B 5/00* | (2006.01) |
| *B62B 3/04* | (2006.01) |
| *B62B 3/00* | (2006.01) |

(52) U.S. Cl.
CPC .............. *B62B 5/0093* (2013.01); *B62B 3/02* (2013.01); *B62B 3/04* (2013.01); *B62B 5/00* (2013.01); *B62B 3/008* (2013.01); *B62B 2206/003* (2013.01); *B62B 2301/044* (2013.01)

(58) Field of Classification Search
CPC ........... B62B 5/0093; B62B 3/04; B62B 5/00; B62B 2206/003; B62B 5/049
See application file for complete search history.

(56) References Cited

U.S. PATENT DOCUMENTS

| 3,948,538 | A * | 4/1976 | Hovila | B60B 33/045 |
| | | | | 280/43.23 |
| 4,108,455 | A * | 8/1978 | James | B65D 19/42 |
| | | | | 16/26 |
| 6,929,249 | B1 * | 8/2005 | Kim | B66F 3/35 |
| | | | | 254/2 B |
| 2013/0121800 | A1 * | 5/2013 | Hacko | B62B 5/0433 |
| | | | | 414/800 |
| 2016/0046312 | A1 * | 2/2016 | Muller | B62B 3/0618 |
| | | | | 280/43.23 |
| 2018/0222515 | A1 * | 8/2018 | Kawade | B62B 5/049 |

* cited by examiner

*Primary Examiner* — Brian L Swenson
(74) *Attorney, Agent, or Firm* — Yee & Associates, P.C.

(57) ABSTRACT

A dolly assembly comprises a base, a plurality of pneumatic cylinders connected to the base, a plurality of wheel assemblies connected to the plurality of pneumatic cylinders, and a pressure relief mechanism. The base has an outer surface configured to support cargo. The pressure relief mechanism is configured to bleed pressure from the plurality of pneumatic cylinders when the base is oriented at or exceeding a set angle.

20 Claims, 13 Drawing Sheets

DOLLY WITH EXTENDABLE WHEEL ASSEMBLIES

BACKGROUND INFORMATION

1. Field

The present disclosure relates generally to transporting cargo and, more specifically, to transporting cargo using a dolly. Yet more specifically, the present disclosure relates to a dolly assembly comprising a plurality of wheel assemblies that are configured to extend and retract.

2. Background

In addition to passengers' luggage, some aircraft also transport heavy cargo, such as revenue freight. Moving large or heavy cargo within the aircraft may be more difficult than desired for employees. Some aircraft include cargo handling system equipment incorporated into the aircraft to move the heavy cargo within the aircraft.

For an aircraft with incorporated cargo handling system equipment, Aviation Regulatory Authority certified cargo containers may be used to contain and transport cargo. However, the certified cargo containers may be at least one of more expensive or heavier than desired.

Therefore, it would be desirable to have a method and apparatus that take into account at least some of the issues discussed above, as well as other possible issues. For example, it would be desirable to have an apparatus for transporting cargo within an aircraft without incorporated cargo handling system equipment.

SUMMARY

An illustrative embodiment of the present disclosure provides a dolly assembly. The dolly assembly comprises a base, a plurality of pneumatic cylinders connected to the base, a plurality of wheel assemblies connected to the plurality of pneumatic cylinders, and a pressure relief mechanism. The base has an outer surface configured to support cargo. The pressure relief mechanism is configured to bleed pressure from the plurality of pneumatic cylinders when the base is oriented at or exceeding a set angle.

Another illustrative embodiment of the present disclosure provides a dolly assembly. The dolly assembly comprises a plurality of pneumatic cylinders, a plurality of wheel assemblies connected to the plurality of pneumatic cylinders, pathways configured to supply pressure from an air pressure inlet to the plurality of pneumatic cylinders to extend the plurality of wheel assemblies to a deployed position, and release pathways configured to bleed pressure from the plurality of pneumatic cylinders in response to the dolly assembly being oriented at or above a set angle to retract the plurality of wheel assemblies to a stored position.

Yet another illustrative embodiment of the present disclosure provides a method. Positive air pressure is introduced to a dolly assembly. A plurality of wheel assemblies of the dolly assembly is extended using the positive air pressure to place the plurality of wheel assemblies in a deployed position. Cargo secured to the dolly assembly is moved using the plurality of wheel assemblies of the dolly assembly while the plurality of wheel assemblies is in the deployed position. The plurality of wheel assemblies of the dolly assembly is automatically retracted in response to the dolly assembly being oriented at or above a set angle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that increasing the weight of an aircraft may decrease the fuel efficiency of the aircraft. Thus, the illustrative embodiments recognize and take into account that increasing the weight of an aircraft increases the operating costs of the aircraft. The illustrative embodiments recognize and take into account that it is desirable to reduce the weight of an aircraft.

The illustrative examples recognize and take into account that it would be desirable to provide options for cargo transportation that may be used to retrofit existing aircraft. The illustrative examples recognize and take into account that simplicity and ease of use may be desirable characteristics for cargo transportation. The illustrative examples further recognize and take into account that cargo transportation for aircraft is performed outdoors and is subject to existing weather conditions. The illustrative examples further recognize and take into account that power sources other than electricity may be desirable in cargo transportation for aircraft.

Figure 1:
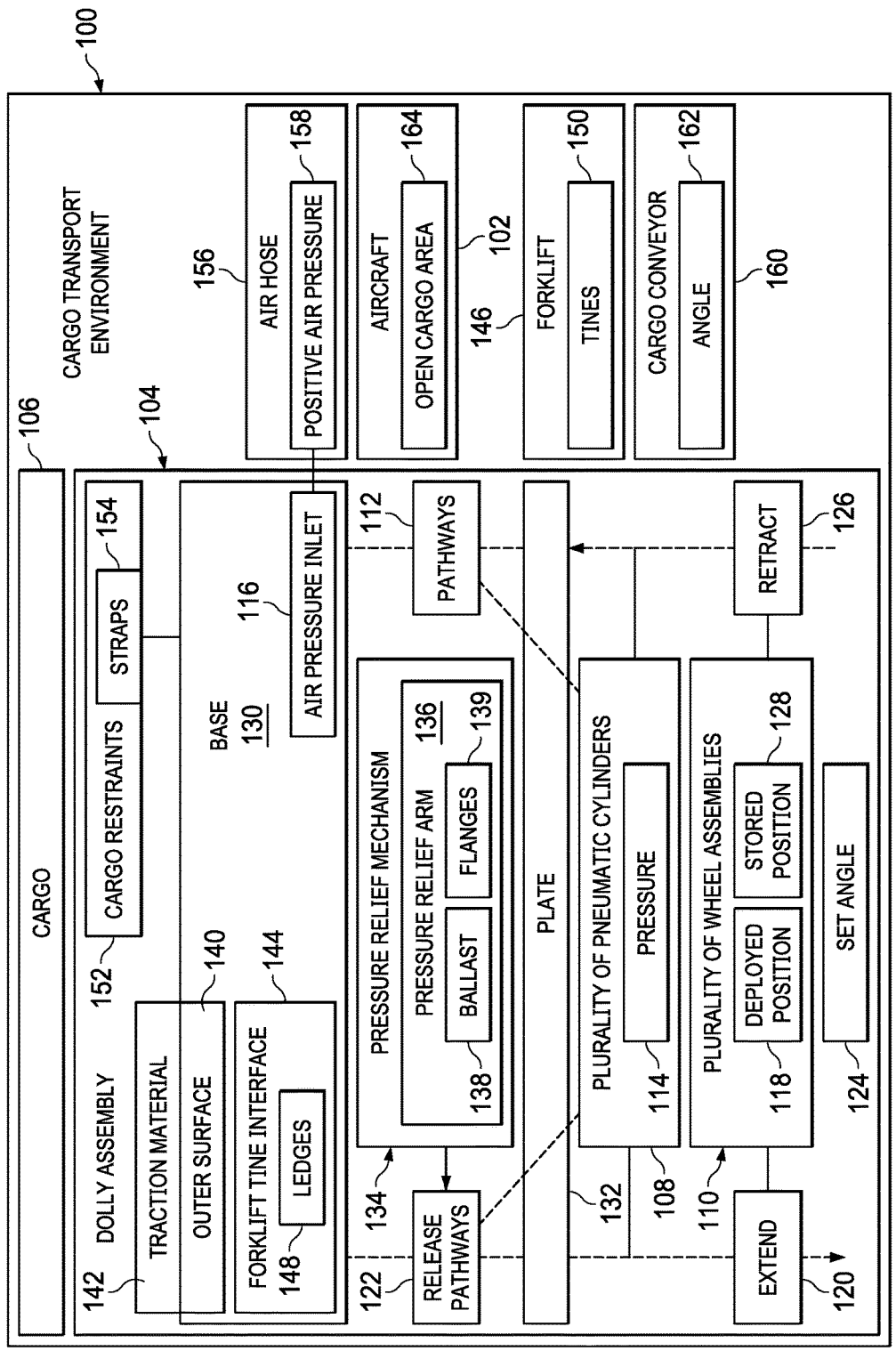
FIG. 1 is an illustration of a block diagram of a cargo transport environment in which a dolly assembly operates in accordance with an illustrative embodiment.

Referring now to the figures and, in particular, with reference to FIG. 1, an illustration of a block diagram of a cargo transport environment in which a dolly assembly operates is depicted in accordance with an illustrative embodiment. Cargo transport environment 100 may take any desirable form. In some illustrative examples, cargo transport environment 100 is an airport in which aircraft 102 operates. In other illustrative examples, cargo transport environment 100 may be a garage, a factory, a construction site, a warehouse, a farm, or any other desirable type of cargo transport environment.

In cargo transport environment 100, dolly assembly 104 may be used to transport cargo 106. In some illustrative examples, dolly assembly 104 comprises plurality of pneumatic cylinders 108, plurality of wheel assemblies 110 connected to plurality of pneumatic cylinders 108, pathways 112 configured to supply pressure 114 from air pressure inlet 116 to plurality of pneumatic cylinders 108 to extend 120 plurality of wheel assemblies 110 to deployed position 118, and release pathways 122 configured to bleed pressure 114 from plurality of pneumatic cylinders 108 in response to dolly assembly 104 being oriented at or above set angle 124 to retract 126 plurality of wheel assemblies 110 to stored position 128.

Plurality of wheel assemblies 110 may take any desirable form. In some illustrative examples, plurality of wheel assemblies 110 takes the form of sets of casters.

In some illustrative examples, pathways 112 are formed by base 130 and plate 132 connected to base 130. In these illustrative examples, when plate 132 is connected to base 130, plate 132 and base 130 form pathways 112 to supply pressure 114 to plurality of pneumatic cylinders 108.

In some illustrative examples, plate 132 may be optional. In these illustrative examples, pathways 112 may be formed by a single component, base 130. In some illustrative examples, a series of connected tubes and fittings (not depicted) may be present. In some illustrative examples a series of connected tubes and fittings may be present when plate 132 is not present. In other illustrative examples, a series of connected tubes and fittings may be present between base 130 and plate 132.

Plurality of pneumatic cylinders 108 is mechanically connected to base 130. Plurality of pneumatic cylinders 108 is pneumatically connected to pathways 112.

In some illustrative examples, release pathways 122 are formed by base 130, plate 132, and pressure relief mechanism 134. Pressure relief mechanism 134 automatically bleeds pressure 114 from plurality of pneumatic cylinders 108 when dolly assembly 104 is oriented at or above set angle 124.

In some illustrative examples, pressure relief mechanism 134 comprises pressure relief arm 136. In some illustrative examples, pressure relief arm 136 has ballast 138. In some illustrative examples, pressure relief arm 136 further comprises two flanges 139, wherein ballast 138 is centered between two flanges 139.

Base 130 has outer surface 140 configured to support cargo 106. In some illustrative examples, base 130 further comprises traction material 142. In some illustrative examples, traction material 142 may be adhered to outer surface 140. In some illustrative examples, traction material 142 may be a component of base 130 and form at least a part of outer surface 140.

In some illustrative examples, dolly assembly 104 comprises base 130 with outer surface 140 configured to support cargo 106, plurality of pneumatic cylinders 108 connected to base 130, plurality of wheel assemblies 110 connected to plurality of pneumatic cylinders 108, and pressure relief mechanism 134 configured to bleed pressure 114 from plurality of pneumatic cylinders 108 when base 130 is oriented at or exceeding set angle 124.

In some illustrative examples, base 130 comprises forklift tine interface 144. Forklift tine interface 144 enables forklift 146 to lift dolly assembly 104 and attached cargo 106. In some illustrative examples, forklift tine interface 144 takes the form of ledges 148. In these illustrative examples, tines 150 are positioned beneath ledges 148 to lift dolly assembly 104.

In some illustrative examples, dolly assembly 104 further comprises cargo restraints 152 mechanically connected to base 130. In some illustrative examples, cargo restraints 152 take the form of straps 154.

As depicted, air pressure inlet 116 is incorporated in base 130. Air pressure inlet 116 is pneumatically connected to pathways 112. To extend 120 plurality of pneumatic cylinders 108 and plurality of wheel assemblies 110, air hose 156 is connected to air pressure inlet 116. Air hose 156 supplies positive air pressure 158 to dolly assembly 104.

Dolly assembly 104 may be used to transport cargo 106 at least one of to aircraft 102 or within aircraft 102. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

For example, air hose 156 may be connected to air pressure inlet 116 while dolly assembly 104 is on the ground. In this example, plurality of wheel assemblies 110 of dolly assembly 104 transports cargo 106 across the ground of cargo transport environment 100.

In some illustrative examples, air hose 156 supplies positive air pressure 158 to extend 120 plurality of wheel assemblies 110 to deployed position 118. Plurality of wheel assemblies 110 is used to move cargo 106 attached to dolly assembly 104 to cargo conveyor 160.

Cargo conveyor 160 conveys cargo and luggage at angle 162 towards open cargo area 164 of aircraft 102. Dolly assembly 104 and attached cargo 106 are loaded onto cargo conveyor 160. Set angle 124 is configured such that set angle 124 is equal to or less than angle 162. For example, if angle 162 is 10 degrees, set angle 124 may be 10 degrees or less.

When dolly assembly 104 is loaded onto cargo conveyor 160, dolly assembly 104 is oriented at or above set angle 124. When dolly assembly 104 is loaded onto cargo conveyor 160, plurality of wheel assemblies 110 is automatically retracted to stored position 128. While dolly assembly 104 is on cargo conveyor 160, plurality of wheel assemblies 110 remain in stored position 128.

When dolly assembly 104 is removed from cargo conveyor 160 in open cargo area 164, plurality of wheel assemblies 110 extend 120 to deployed position 118. In some illustrative examples, air hose 156 remains attached to air pressure inlet 116 as dolly assembly 104 travels on cargo conveyor 160. In other illustrative examples, air hose 156 may be attached when dolly assembly 104 is removed from cargo conveyor 160, to extend 120 plurality of wheel assemblies 110.

The illustration of cargo transport environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although dolly assembly 104 is depicted for use with respect to aircraft 102, dolly assembly 104 may be used in any desirable location. For example, dolly assembly 104 may be used within a warehouse to move across the warehouse floor. As another example, although pressure relief mechanism 134 is shown as only one pressure relief arm, pressure relief arm 136, in other illustrative examples, pressure relief mechanism 134 may have multiple pressure relief arms.

In some illustrative examples, base 130 and plate 132 form an airtight assembly including a reservoir (not depicted) for retaining positive air pressure 158. In these illustrative examples, air hose 156 may be removed from air pressure inlet 116 while maintaining plurality of wheel assemblies 110 in deployed position 118. In some illustrative examples, base 130 and plate 132 form a reservoir for storing positive air pressure 158 sufficient to extend 120 plurality of wheel assemblies 110 to deployed position 118 without air hose 156 being actively connected to air pressure inlet 116.

Figure 2:
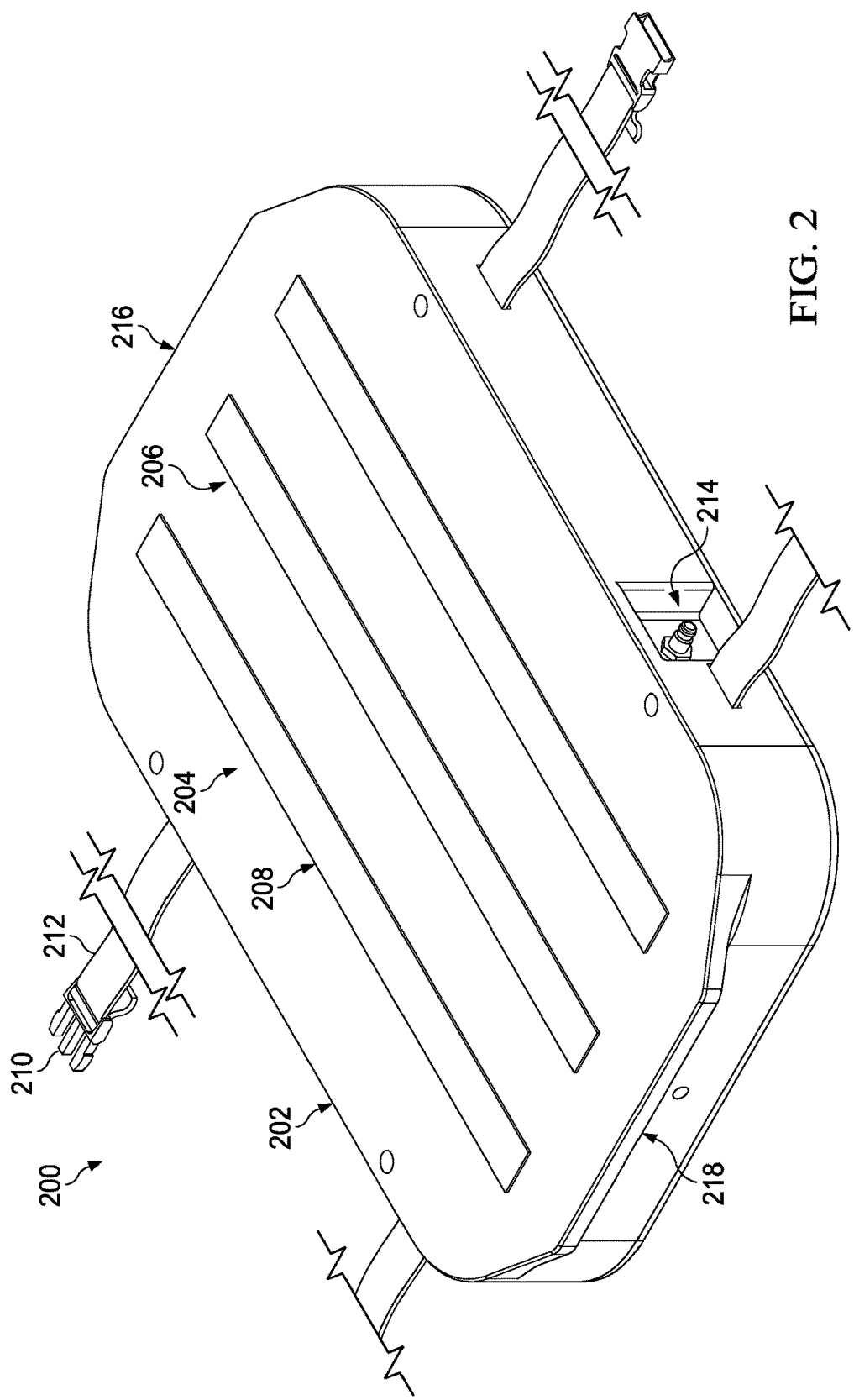
FIG. 2 is an illustration of a top isometric view of a dolly assembly in accordance with an illustrative embodiment.

Turning now to FIG. 2, an illustration of a top isometric view of a dolly assembly is depicted in accordance with an illustrative embodiment. Dolly assembly 200 is a physical implementation of dolly assembly 104, shown in block form in FIG. 1.

Dolly assembly 200 comprises base 202 with outer surface 204 configured to support cargo (not depicted). As depicted, outer surface 204 has traction material 206. In this illustrative example, traction material 206 takes the form of traction tape 208. Traction material 206 is present on outer surface 204 to help retain cargo (not depicted) on outer surface 204. Although traction material 206 is depicted as traction tape 208, traction material 206 may be formed of any desirable material and any desirable shape.

Cargo restraints 210 are present to retain cargo on dolly assembly 200. As depicted, cargo restraints 210 take the form of straps 212.

Air pressure inlet 214 is present in base 202. Base 202 also has fork tine interface 216. Fork tine interface 216 takes the form of ledges 218.

Figure 3:
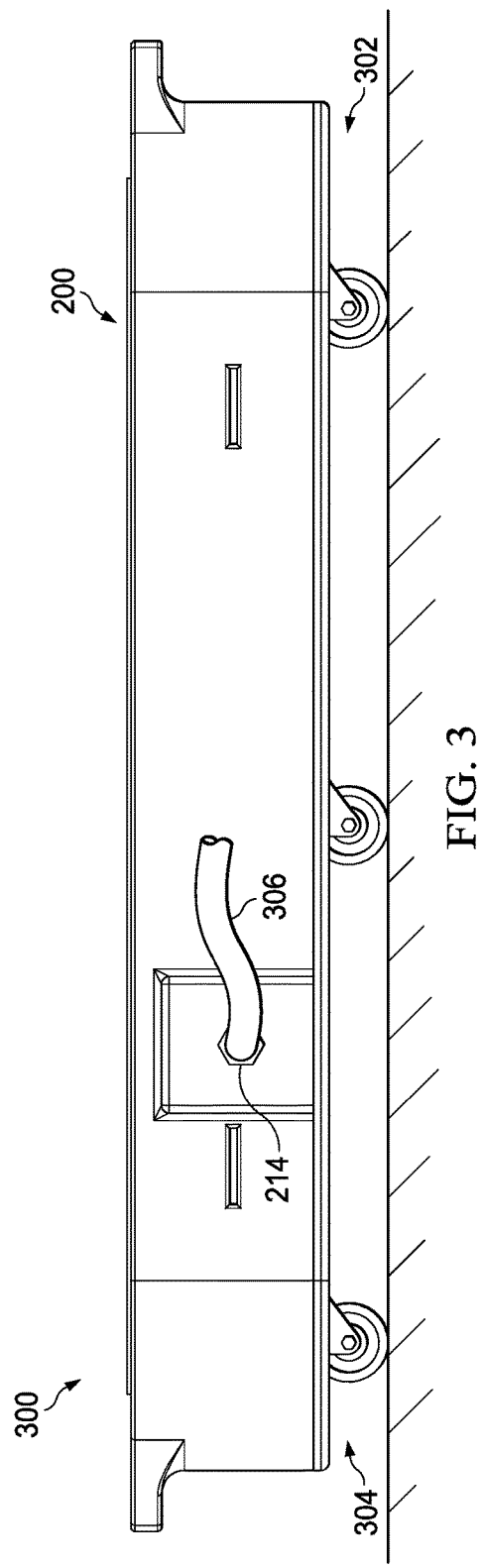
FIG. 3 is an illustration of a side view of a dolly assembly with wheel assemblies extended in accordance with an illustrative embodiment.

Turning now to FIG. 3, an illustration of a side view of a dolly assembly with wheel assemblies extended is depicted in accordance with an illustrative embodiment. View 300 is a side view of dolly assembly 200 of FIG. 2.

In view 300, plurality of wheel assemblies 302 of dolly assembly 200 is extended to deployed position 304. In view 300, positive air pressure is supplied by air hose 306 connected to air pressure inlet 214. The positive air pressure supplied to base 202 is pneumatically communicated to a plurality of pneumatic cylinders (not depicted) connected to plurality of wheel assemblies 302.

Figure 4:
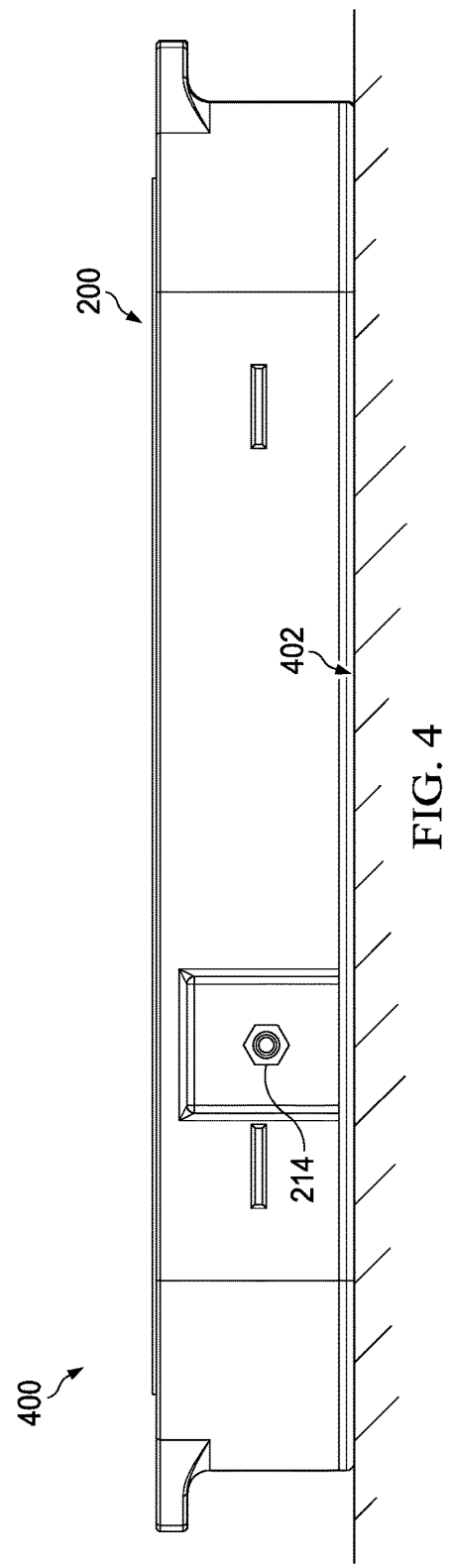
FIG. 4 is an illustration of a side view of a dolly assembly with wheel assemblies retracted in accordance with an illustrative embodiment.

Turning now to FIG. 4, an illustration of a side view of a dolly assembly with wheel assemblies retracted is depicted in accordance with an illustrative embodiment. View 400 is a side view of dolly assembly 200 of FIG. 2.

In view 400, plurality of wheel assemblies 302 of dolly assembly 200 is retracted to a stored position. In view 400, plate 402 is visible. Dolly assembly 200 rests on plate 402 when plurality of wheel assemblies 302 is in the stored position.

In some illustrative examples, plurality of wheel assemblies 302 of dolly assembly 200 are automatically placed in the stored position. For example, when dolly assembly 200 is oriented at or above a set angle, pressure is bled from a plurality of pneumatic cylinders to place plurality of wheel assemblies 302 of FIG. 3 into the stored position.

In other illustrative examples, plurality of wheel assemblies 302 of dolly assembly 200 are manually placed in the stored position. For example, when dolly assembly 200 is in a desired location, the pressure in the plurality of pneumatic cylinders may be manually bled to rest dolly assembly 200 on plate 402.

Figure 5:
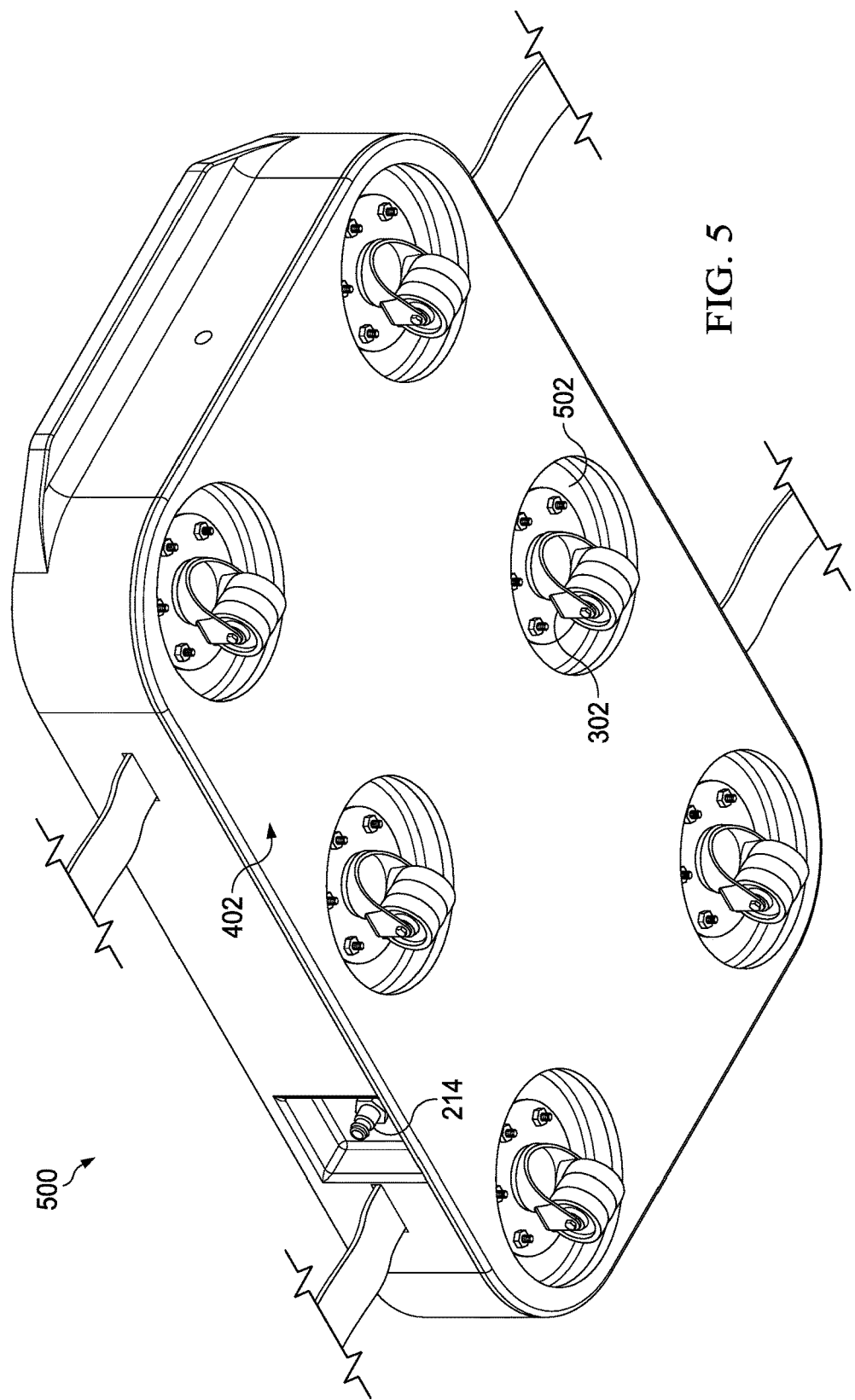
FIG. 5 is an illustration of a bottom isometric view of a dolly assembly with wheel assemblies extended in accordance with an illustrative embodiment.

Turning now to FIG. 5, an illustration of a bottom isometric view of a dolly assembly with wheel assemblies extended is depicted in accordance with an illustrative embodiment. View 500 is a bottom isometric view of dolly assembly 200 of FIG. 2 with plurality of wheel assemblies 302 extended. In view 500, portions of plurality of pneumatic cylinders 502 connected to plurality of wheel assemblies 302 are also visible.

Figure 6:
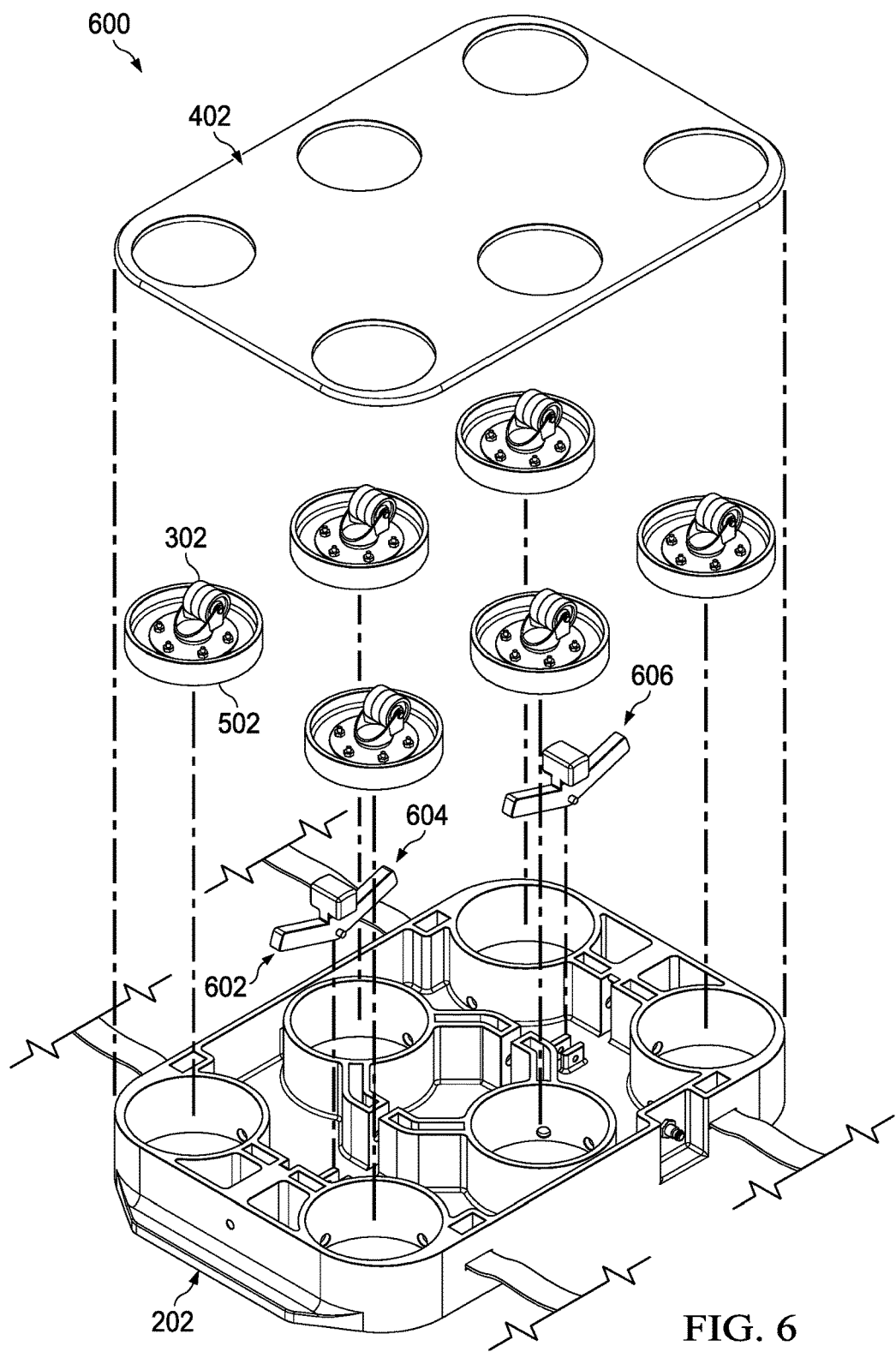
FIG. 6 is an illustration of an exploded view of a dolly assembly in accordance with an illustrative embodiment.

Turning now to FIG. 6, an illustration of an exploded view of a dolly assembly is depicted in accordance with an illustrative embodiment. View 600 is an exploded view of dolly assembly 200 of FIG. 2. In view 600, base 202, plurality of pneumatic cylinders 502 connected to plurality of wheel assemblies 302, pressure relief mechanism 602, and plate 402 are visible. As depicted, pressure relief mechanism 602 takes the form of pressure relief arm 604 and pressure relief arm 606.

Pressure relief arm 604 and pressure relief arm 606 are configured to automatically bleed pressure from plurality of pneumatic cylinders 502 when dolly assembly 200 is oriented at or exceeding a set angle. Pressure relief arm 604 and pressure relief arm 606 pivot to complete or block release pathways (not depicted) formed within base 202 and plate 402.

Figure 7:
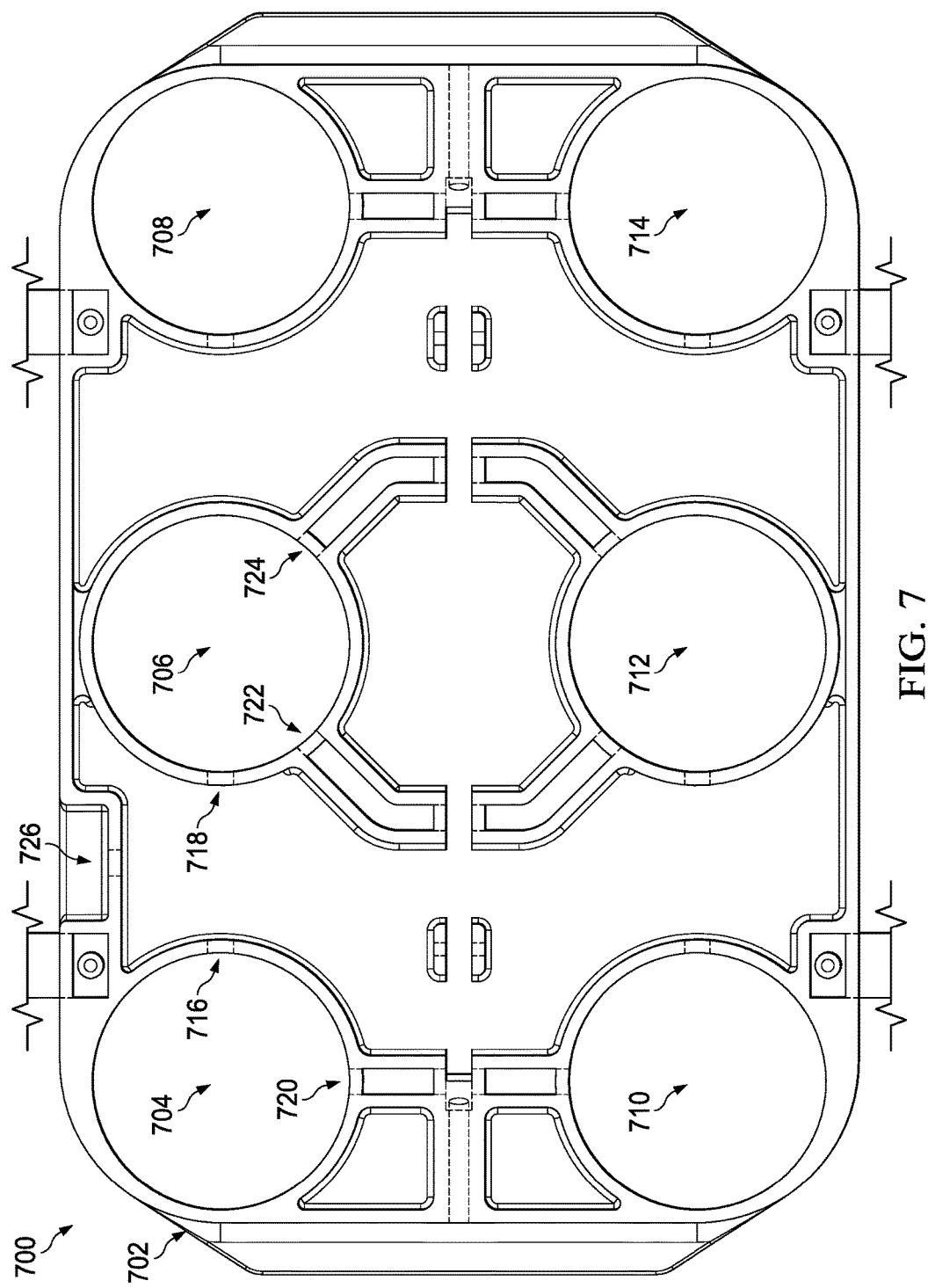
FIG. 7 is an illustration of a bottom view of a base of a dolly assembly in accordance with an illustrative embodiment.

Turning now to FIG. 7, an illustration of a bottom view of a base of a dolly assembly is depicted in accordance with an illustrative embodiment. View 700 is a bottom view of base 702 of a dolly assembly, such as dolly assembly 104 of FIG. 1 or dolly assembly 200 of FIG. 2.

Along with a plate (not depicted), base 702 forms pathways for directing pressure to a plurality of pneumatic cylinders and release pathways for bleeding pressure from the pneumatic cylinders. As depicted, location 704, location 706, location 708, location 710, location 712, and location 714 are locations in which the plurality of pneumatic cylinders will be connected. Each of location 704, location 706, location 708, location 710, location 712, and location 714 has a respective inlet for a pneumatic cylinder. For example, location 704 has inlet 716. As another example, location 706 has inlet 718.

Likewise, each of location 704, location 706, location 708, location 710, location 712, and location 714 has at least one respective outlet to bleed pressure from the respective pneumatic cylinder. For example, location 704 has outlet 720. As another example, location 706 has outlet 722 and outlet 724.

When positive air pressure is supplied to air pressure inlet 726 and base 702 is below a set angle, a pressure relief mechanism blocks the respective outlets of each respective outlet of location 704, location 706, location 708, location 710, location 712, and location 714. When positive air pressure is supplied to air pressure inlet 726 and base 702 is below a set angle, a pressure relief mechanism blocks release pathways connected to each respective outlet of location 704, location 706, location 708, location 710, location 712, and location 714. When the pressure relief mechanism moves to open the release pathways, pressure bleeds from the plurality of pneumatic cylinders.

Figure 8:
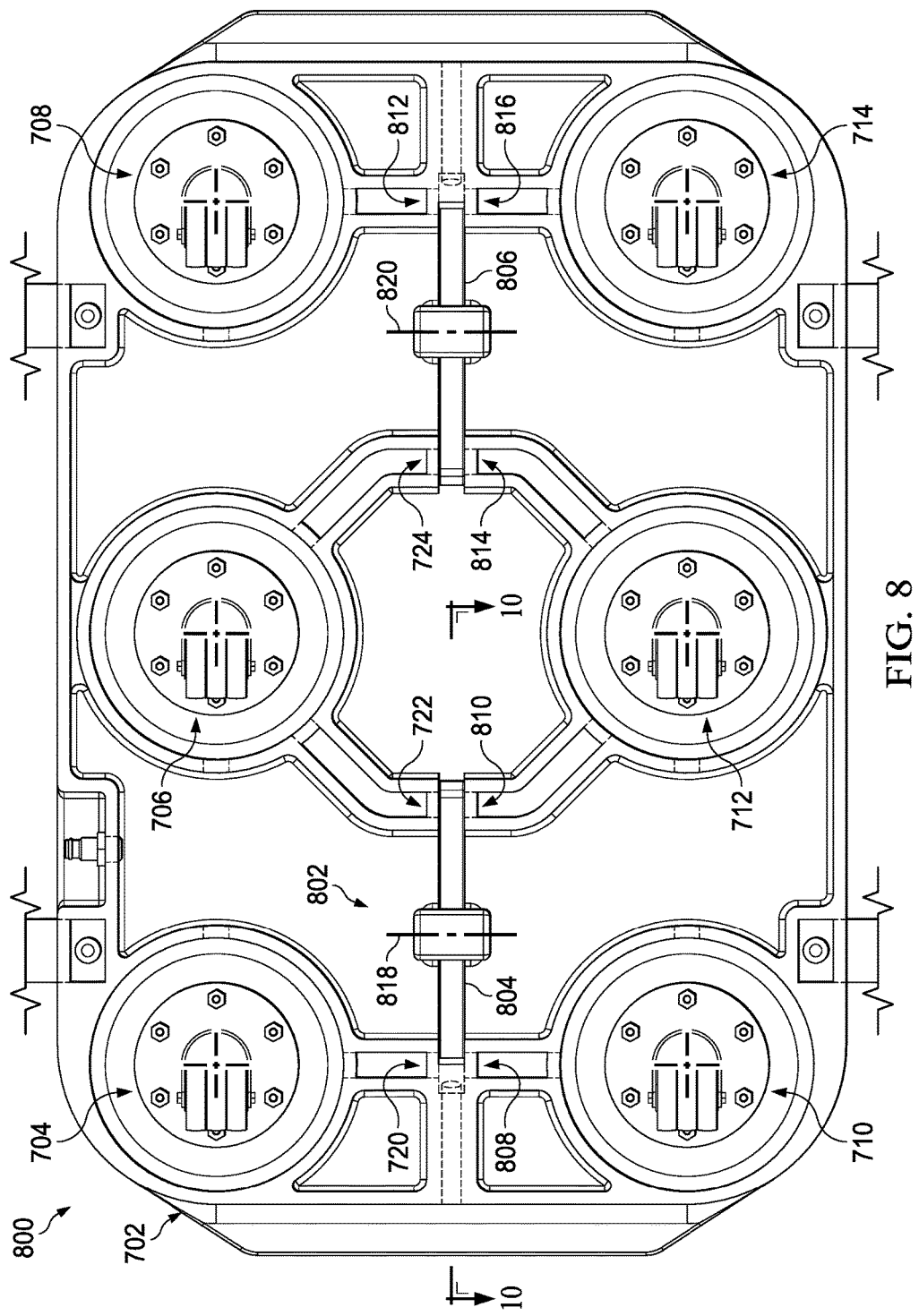
FIG. 8 is an illustration of a bottom view of a base and a pressure relief arm of a dolly assembly in accordance with an illustrative embodiment.

Turning now to FIG. 8, an illustration of a bottom view of a base and a pressure relief arm of a dolly assembly is depicted in accordance with an illustrative embodiment. View 800 is a view of base 702 of FIG. 7 with pressure relief mechanism 802 in place. As depicted, pressure relief mechanism 802 takes the form of pressure relief arm 804 and pressure relief arm 806.

As depicted, pressure relief mechanism 802 will block release pathways when base 702 is below a set angle. By blocking release pathways, pressure is maintained in a plurality of pneumatic cylinders connected to base 702.

As depicted, pressure relief arm 804 may block outlet 720, outlet 722, outlet 808, and outlet 810. Pressure relief arm 804 maintains pressure in pneumatic cylinders at location 704, location 706, location 710, and location 712. As depicted, pressure relief arm 806 may block outlet 724, outlet 812, outlet 814, and outlet 816. Pressure relief arm 806 maintains pressure in pneumatic cylinders at location 706, location 708, location 712, and location 714.

Pressure relief arm 804 rotates about pivot point 818. Pressure relief arm 806 rotates about pivot point 820. When pressure relief arm 804 and pressure relief arm 806 pivot relative to base 702, each of outlet 720, outlet 722, outlet 724, outlet 808, outlet 810, outlet 812, outlet 814, and outlet 816 are opened to bleed pressure from the plurality of pneumatic cylinders connected to base 702.

Figure 9:
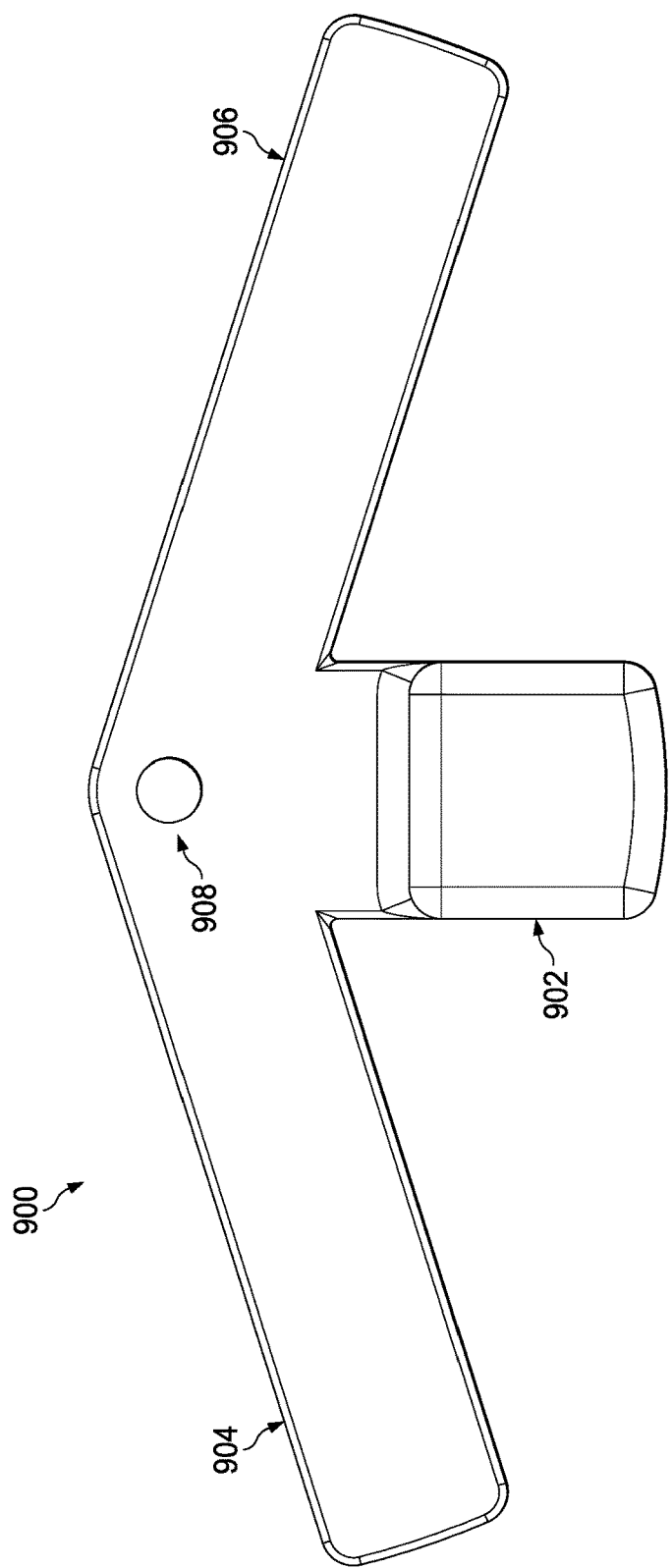
FIG. 9 is an illustration of a side view of a pressure relief arm in accordance with an illustrative embodiment.

Turning now to FIG. 9, an illustration of a side view of a pressure relief arm is depicted in accordance with an illustrative embodiment. Pressure relief arm 900 is a physical implementation of pressure relief arm 136 of FIG. 1. Pressure relief arm 900 may be the same as pressure relief arm 604 or pressure relief arm 606 of FIG. 6. Pressure relief arm 900 may be a component of pressure relief mechanism 802 of FIG. 8.

Pressure relief arm 900 has ballast 902, flange 904, flange 906, and pivot point 908. Ballast 902 is centered between flange 904 and flange 906. Ballast 902 is configured to substantially maintain an orientation of pressure relief arm 900 relative to the ground due to gravity.

When a dolly assembly containing pressure relief arm 900 is below a set angle, each of flange 904 and flange 906 blocks release pathways for the dolly assembly to maintain pressure within a plurality of pneumatic cylinders. By having substantially the same pressure on each side of both flange 904 and flange 906, pressure relief arm 900 pivots about pivot point 908 with little to no friction.

Figure 10:
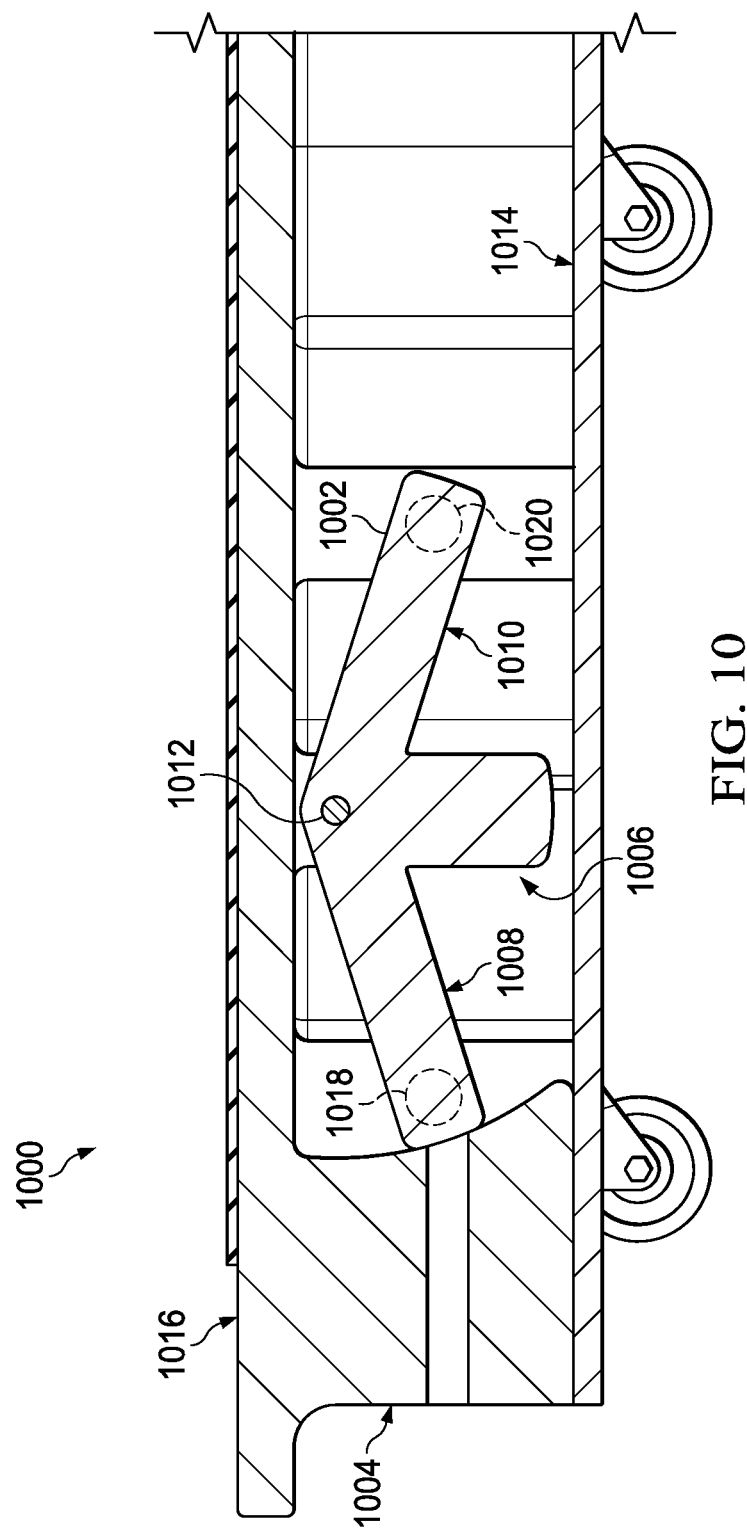
FIG. 10 is an illustration of a cross-sectional view of a dolly assembly when substantially level in accordance with an illustrative embodiment.

Turning now to FIG. 10, an illustration of a cross-sectional view of a dolly assembly when substantially level is depicted in accordance with an illustrative embodiment. In view 1000, pressure relief arm 1002 is present in base 1004. Pressure relief arm 1002 is a physical implementation of pressure relief arm 136 of FIG. 1. Pressure relief arm 1002 may be the same as pressure relief arm 604 or pressure relief arm 606 of FIG. 6. Pressure relief arm 1002 may be the same as either pressure relief arm 804 or pressure relief arm 806 of FIG. 8. Pressure relief arm 1002 may be the same as pressure relief arm 900 of FIG. 9.

Pressure relief arm 1002 has ballast 1006, flange 1008, flange 1010, and pivot point 1012. Ballast 1006 is centered between flange 1008 and flange 1010. Ballast 1006 is configured to substantially maintain an orientation of pressure relief arm 1002 relative to the ground due to gravity.

As depicted, flange 1008 and flange 1010 blocks release pathways created by base 1004 and plate 1014 to maintain pressure within a plurality of pneumatic cylinders of dolly assembly 1016. Specifically, flange 1008 blocks opening 1018 and flange 1010 blocks opening 1020. By having substantially the same pressure on each side of both flange 1008 and flange 1010, pressure relief arm 1002 pivots about pivot point 1012 with little to no friction.

Figure 11:
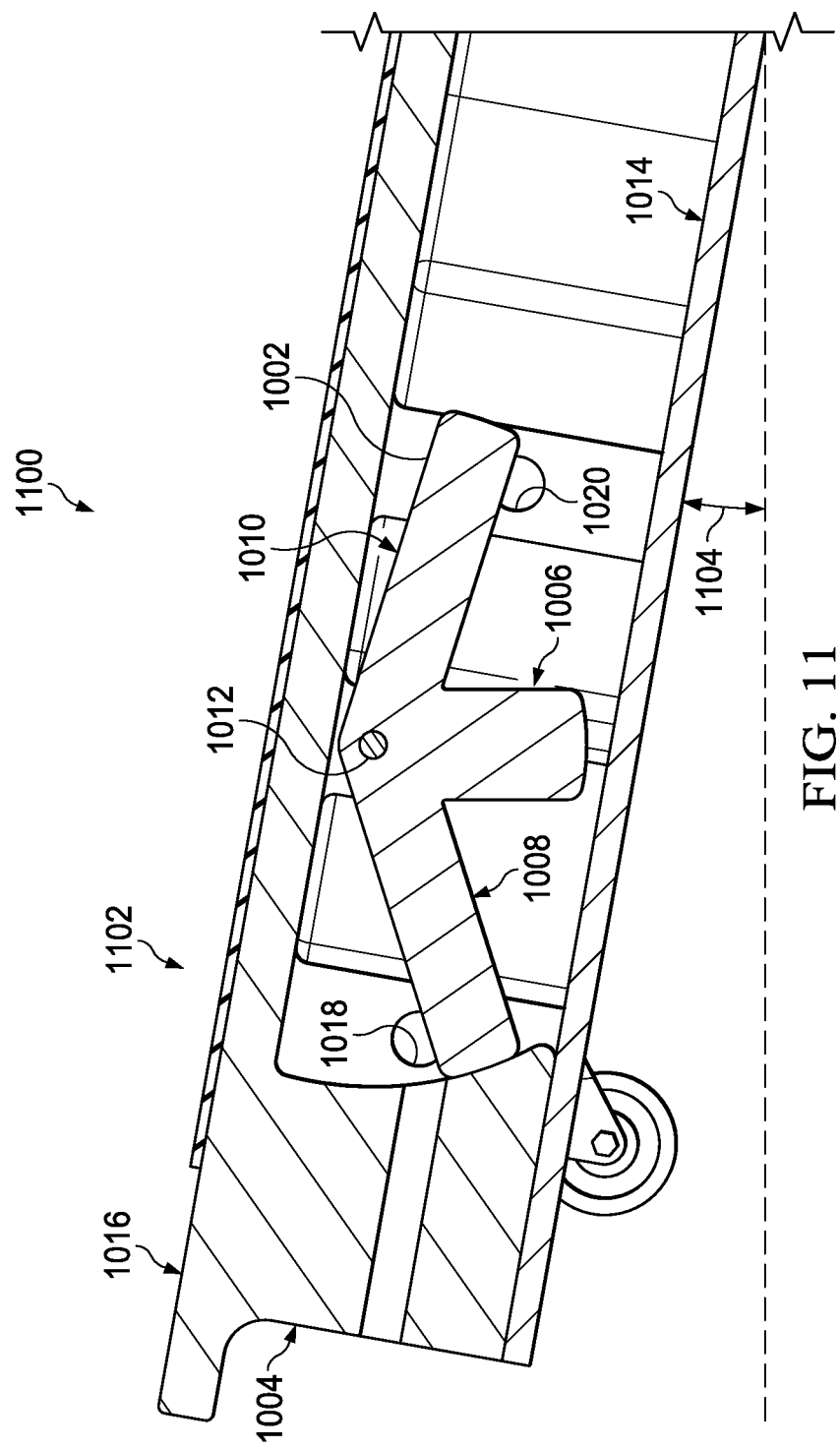
FIG. 11 is an illustration of a cross-sectional view of a dolly assembly oriented at or above a set angle to retract a plurality of wheel assemblies in accordance with an illustrative embodiment.

Turning now to FIG. 11, an illustration of a cross-sectional view of a dolly assembly oriented at or above a set angle to retract a plurality of wheel assemblies is depicted in accordance with an illustrative embodiment. View 1100 is a view of dolly assembly 1016 in orientation 1102. In orientation 1102, dolly assembly 1016 is at angle 1104 that is or exceeds a set angle for dolly assembly 1016.

As depicted in view 1100, pressure relief arm 1002 pivoted about pivot point 1012 relative to view 1000 of FIG. 10. In view 1100, flange 1008 has moved relative to opening 1018. As depicted, opening 1018 is unobstructed, opening release pathways in dolly assembly 1016. In view 1100, flange 1010 has moved relative to opening 1020. As depicted, opening 1020 is unobstructed, opening release pathways in dolly assembly 1016.

Figure 12:
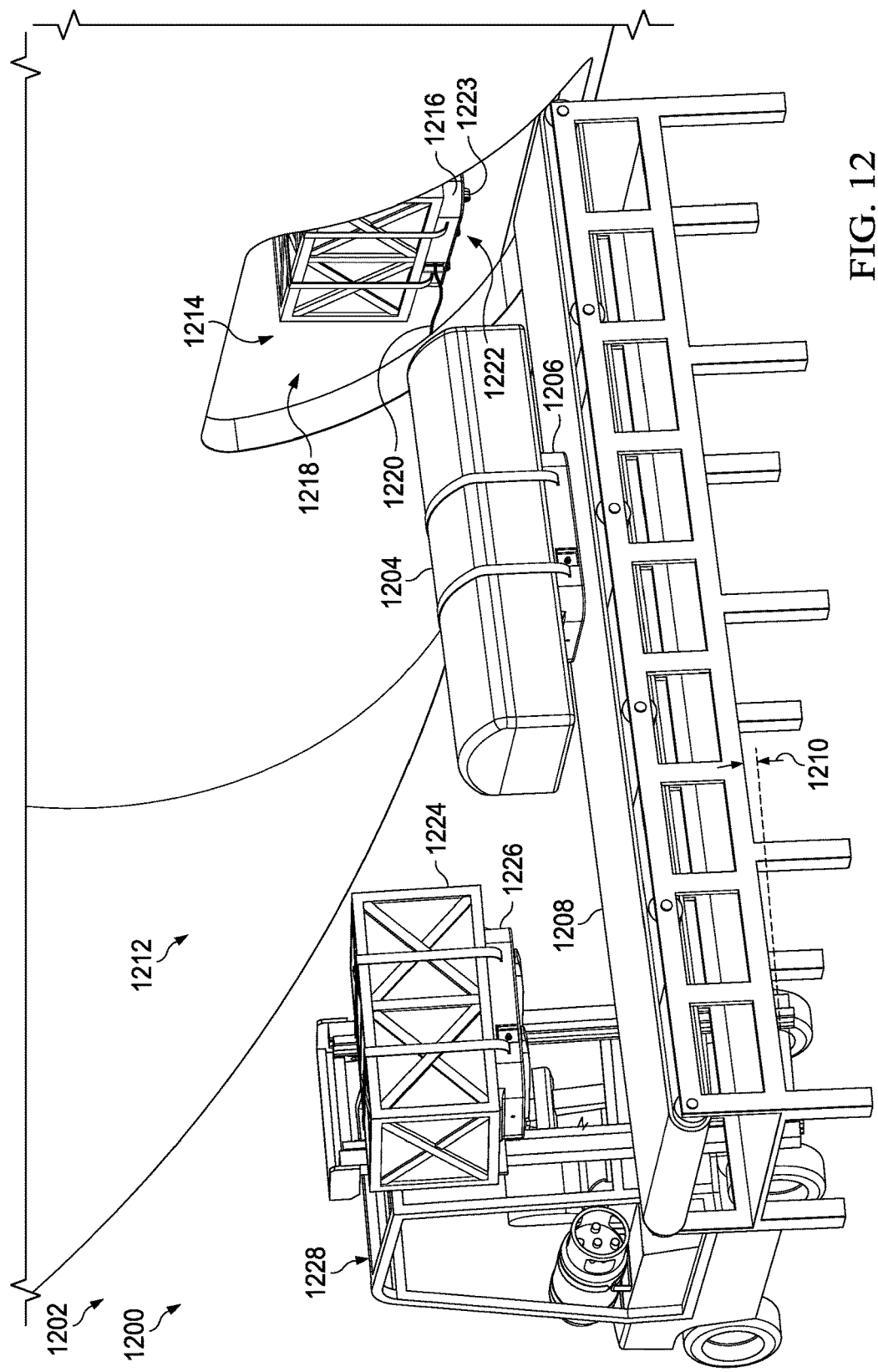
FIG. 12 is an illustration of an aircraft loading area in accordance with an illustrative embodiment.

Turning now to FIG. 12, an illustration of an aircraft loading area is depicted in accordance with an illustrative embodiment. Aircraft loading area 1200 is a physical implementation of cargo transport environment 100 shown in block form in FIG. 1.

In view 1202 of aircraft loading area 1200, cargo 1204 attached to dolly assembly 1206 is present on cargo conveyor 1208. Cargo conveyor 1208 has angle 1210 at which cargo and luggage is conveyed to aircraft 1212.

At angle 1210, wheel assemblies of dolly assembly 1206 are in a stored position. In view 1202 of aircraft loading area 1200, cargo 1214 attached to dolly assembly 1216 is present in open cargo area 1218 of aircraft 1212.

As depicted, air hose 1220 supplies positive air pressure to dolly assembly 1216. Plurality of wheel assemblies 1222 of dolly assembly 1216 is in deployed position 1223. Cargo 1214 attached to dolly assembly 1216 is moved using plurality of wheel assemblies 1222. Once cargo 1214 is present in a desired location of open cargo area 1218, pressure is bled from a plurality of pneumatic cylinders connected to plurality of wheel assemblies 1222.

In view 1202 of aircraft loading area 1200, cargo 1224 attached to dolly assembly 1226 is being transported by forklift 1228. In some illustrative examples, forklift 1228 may be used to lift cargo 1224 and dolly assembly 1226 from a cart and place cargo 1224 and dolly assembly 1226 onto cargo conveyor 1208.

Figure 13:
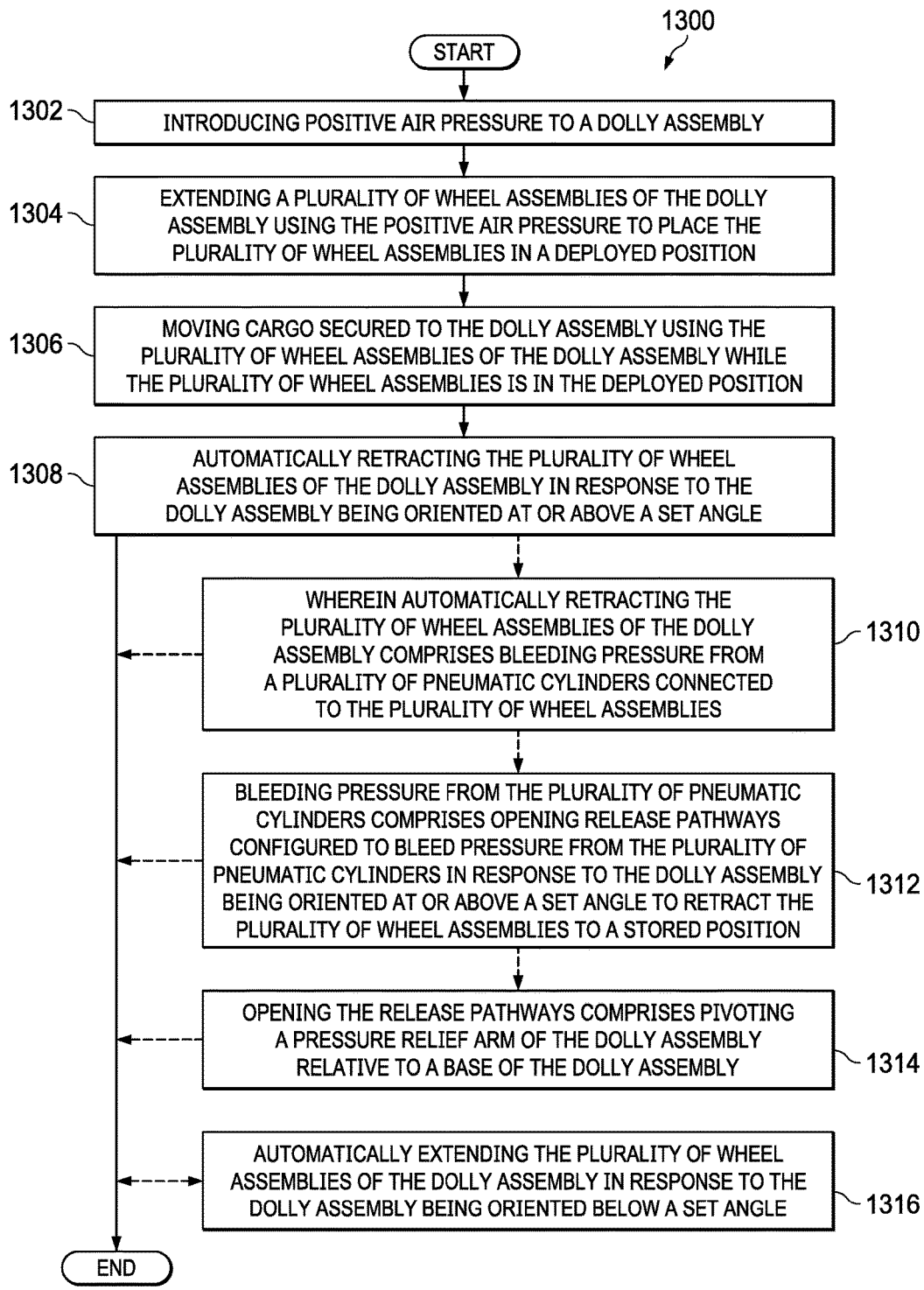
FIG. 13 is an illustration of a flowchart of a method for using a dolly assembly to move cargo in accordance with an illustrative embodiment.

Turning now to FIG. 13, an illustration of a flowchart of a method for using a dolly assembly to move cargo is depicted in accordance with an illustrative embodiment. Method 1300 may be implemented in cargo transport environment 100 using dolly assembly 104 as shown in block form in FIG. 1. Method 1300 may be implemented using dolly assembly 200 from FIGS. 2-6. Method 1300 may be implemented using a dolly assembly containing any components shown in FIGS. 7-11. Method 1300 may be implemented in aircraft loading area 1200 of FIG. 12.

Method 1300 introduces positive air pressure to a dolly assembly (operation 1302). Method 1300 extends a plurality of wheel assemblies of the dolly assembly using the positive air pressure to place the plurality of wheel assemblies in a deployed position (operation 1304). Method 1300 moves cargo secured to the dolly assembly using the plurality of wheel assemblies of the dolly assembly while the plurality of wheel assemblies is in the deployed position (operation 1306). Method 1300 automatically retracts the plurality of wheel assemblies of the dolly assembly in response to the dolly assembly being oriented at or above a set angle (operation 1308). Afterwards, the method terminates.

In some illustrative examples, automatically retracting the plurality of wheel assemblies of the dolly assembly comprises bleeding pressure from a plurality of pneumatic cylinders connected to the plurality of wheel assemblies (operation 1310). In some illustrative examples, bleeding pressure from the plurality of pneumatic cylinders comprises opening release pathways configured to bleed pressure from the plurality of pneumatic cylinders in response to the dolly assembly being oriented at or above a set angle to retract the plurality of wheel assemblies to a stored position (operation 1312).

In some illustrative examples, opening the release pathways comprises pivoting a pressure relief arm of the dolly assembly relative to a base of the dolly assembly (operation 1314). In some illustrative examples, method 1300 automatically extends the plurality of wheel assemblies of the dolly assembly in response to the dolly assembly being oriented below a set angle (operation 1316).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 1300 are performed. For example, operations 1310 through 1316 are optional.

Figure 14:
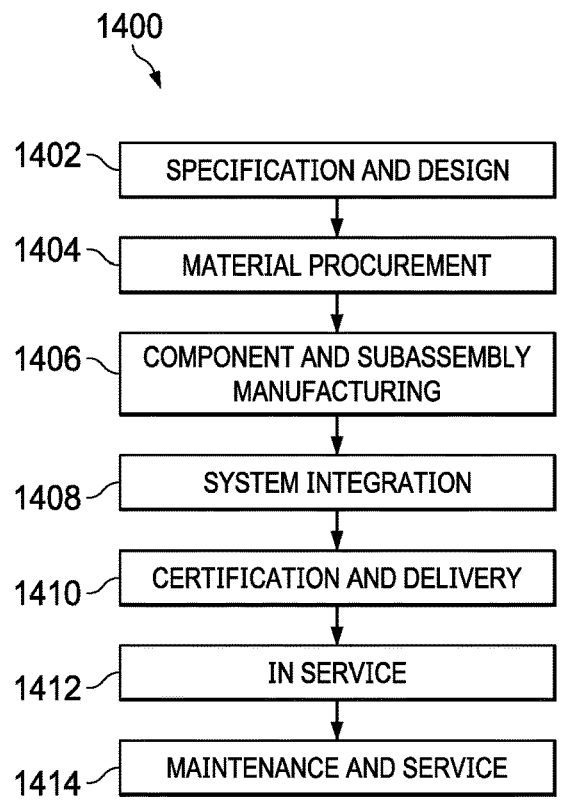
FIG. 14 is an illustration of an aircraft manufacturing and service method in the form of a block diagram in accordance with an illustrative embodiment.
Figure 15:
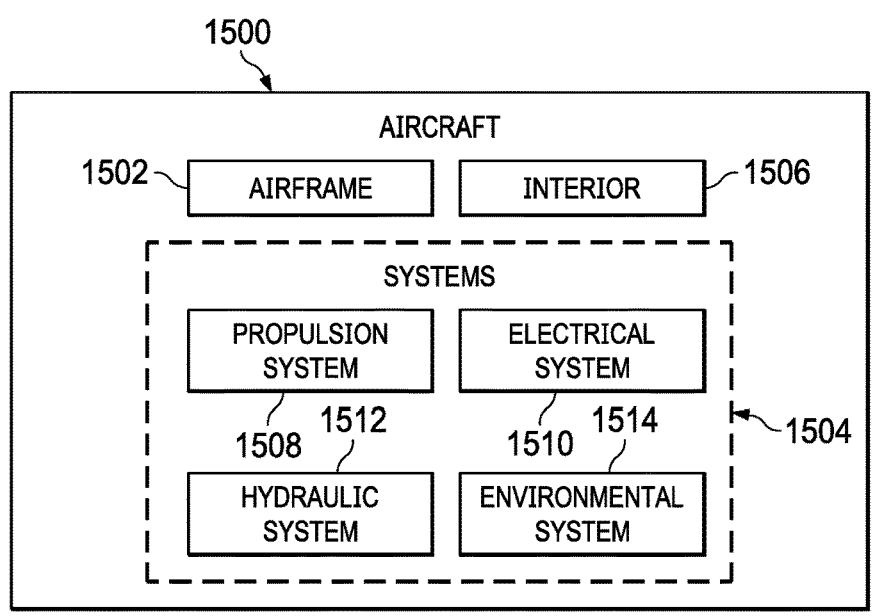
FIG. 15 is an illustration of an aircraft in the form of a block diagram in which an illustrative embodiment may be implemented.

The illustrative embodiments of the present disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 takes place. Thereafter, aircraft 1500 may go through certification and delivery 1410 in order to be placed in service 1412. While in service 1412 by a customer, aircraft 1500 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 in FIG. 14 and may include airframe 1502 with a plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400. One or more illustrative embodiments may be used during component and subassembly manufacturing 1406, in service 1412, or maintenance and service 1414 of FIG. 14. For example, dolly assembly 104 may be used to transport heavy parts within a manufacturing environment during component and subassembly manufacturing 1406. As another example, dolly assembly 104 may be used to transport cargo while aircraft 1500 is in service 1412. Apparatuses and methods embodied herein may be employed in moving cargo within interior 1506 of aircraft 1500.

The illustrative examples present a dolly assembly with extendable wheel assemblies. The wheel assemblies are extended and retracted pneumatically.

The dolly assembly allows cargo to be strapped directly to the fork lift-able dolly without the added weight of an Aviation Regulatory Authority certified cargo container, and allows the cargo to be moved into and inside an airplane's cargo compartment without the added weight of an Aviation Regulatory Authority certified cargo handling system. Further, the dolly assembly may be considerably less expensive than either the certified cargo container or the certified cargo handling system.

The dolly assembly allows for safe handling of air cargo into and out of airplane cargo compartments. The wheeled assemblies of the dolly assembly retract automatically when on a sloped surface of a ground-based cargo conveyor belt loader, and extend automatically for movement on a ground-based baggage cart and inside an airplane. The wheel assembly position is powered by compressed air that is supplied by a self-coiling air hose from a belt loader or other desirable tool. The automatic extension and retraction of the wheel assemblies reduces or eliminates undesirable rolling such as in-flight or rolling down the belt loader. The dolly assembly may be used in airplane cargo compartments or any other desirable environments.

By the wheel assemblies extending when the dolly assembly is on a relatively flat surface, the wheel assemblies permit ease of movement on the relatively flat surface. By retracting when the dolly assembly is on a sloped surface, the wheel assemblies prevent ease of movement on the sloped surface.

The extension and retraction of the wheel assemblies is powered by compressed air. The extension and retraction of the wheel assemblies is controlled by a level-sensing pressure relief valve (quantity of two per dolly). The pressure relief valve opens and closes manifold ports that will bleed the air that causes the wheel assemblies to extend.

In some illustrative examples, the pressure relief valve is a simple balance arm design with little to no frictional resistance. Friction is eliminated by applying an equal and opposite pressure load to each side of the balance arm. The balance arm hinge point is located at the center and top edge of the balance arm. Appreciable ballast is added below the hinge point to control and stabilize its movement.

Each wheel assembly is connected to a structure designed to function as a cylinder with minimal air leakage. High pressure air enters passageways around the upper perimeter of the cylindrical housing causing the cylindrical wheel assembly support to extend.

The illustrative examples offer a low-cost way for airlines to expand operations of aircraft without incorporated cargo handling systems to gain revenue from cargo. The initial investment for the dolly assemblies would be lower than existing retrofit cargo handling systems and containers. The additional weight contributed by the dolly assemblies would be less than existing retrofit cargo handling systems and containers. Further, no new ground support equipment would be required to utilize the dolly assemblies. For example, container dollies, cargo loaders, and warehouse equipment would not be necessary with the dolly assemblies.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A dolly assembly comprising:
a base with an outer surface configured to support cargo;
a plurality of pneumatic cylinders connected to the base;
a plurality of wheel assemblies connected to the plurality of pneumatic cylinders; and
a pressure relief mechanism configured to bleed pressure from the plurality of pneumatic cylinders when the base is oriented at or exceeding a set angle.

2. The dolly assembly of claim 1, wherein the base comprises a forklift tine interface.

3. The dolly assembly of claim 1 further comprising:
traction material adhered to the outer surface of the base.

4. The dolly assembly of claim 1 further comprising:
cargo restraints mechanically connected to the base.

5. The dolly assembly of claim 4, wherein the cargo restraints take the form of straps.

6. The dolly assembly of claim 1 further comprising:
a plate connected to the base, wherein the plate and the base form pathways to supply pressure to the plurality of pneumatic cylinders.

7. The dolly assembly of claim 6 further comprising:
an air pressure inlet in the base, wherein the air pressure inlet is pneumatically connected to the pathways.

8. The dolly assembly of claim 1, wherein the pressure relief mechanism comprises a pressure relief arm with a ballast.

9. The dolly assembly of claim 8, wherein the pressure relief arm further comprises two flanges, wherein the ballast is centered between the two flanges.

10. A dolly assembly comprising:
a plurality of pneumatic cylinders;
a plurality of wheel assemblies connected to the plurality of pneumatic cylinders;
pathways configured to supply pressure from an air pressure inlet to the plurality of pneumatic cylinders to extend the plurality of wheel assemblies to a deployed position; and
release pathways configured to bleed pressure from the plurality of pneumatic cylinders in response to the dolly assembly being oriented at or above a set angle to retract the plurality of wheel assemblies to a stored position.

11. The dolly assembly of claim 10, wherein the pathways are formed by a base and a plate connected to the base, wherein the plurality of pneumatic cylinders is connected to the base.

12. The dolly assembly of claim 11, wherein the release pathways are formed by the base, the plate, and a pressure relief mechanism.

13. The dolly assembly of claim 12, wherein the pressure relief mechanism comprises a pressure relief arm with a ballast centered between two flanges.

14. The dolly assembly of claim 10, wherein the plurality of pneumatic cylinders is connected to a base having an outer surface configured to support cargo.

15. The dolly assembly of claim 14, wherein the base further comprises traction material and cargo restraints.

16. A method comprising:
introducing positive air pressure to a dolly assembly;
extending a plurality of wheel assemblies of the dolly assembly using the positive air pressure to place the plurality of wheel assemblies in a deployed position;
moving cargo secured to the dolly assembly using the plurality of wheel assemblies of the dolly assembly while the plurality of wheel assemblies is in the deployed position; and
automatically retracting the plurality of wheel assemblies of the dolly assembly in response to the dolly assembly being oriented at or above a set angle.

17. The method of claim 16, wherein automatically retracting the plurality of wheel assemblies of the dolly assembly comprises bleeding pressure from a plurality of pneumatic cylinders connected to the plurality of wheel assemblies.

18. The method of claim 17, wherein bleeding pressure from the plurality of pneumatic cylinders comprises opening release pathways configured to bleed pressure from the plurality of pneumatic cylinders in response to the dolly assembly being oriented at or above a set angle to retract the plurality of wheel assemblies to a stored position.

19. The method of claim 18, wherein opening the release pathways comprises pivoting a pressure relief arm of the dolly assembly relative to a base of the dolly assembly.

20. The method of claim 16 further comprising:
automatically extending the plurality of wheel assemblies of the dolly assembly in response to the dolly assembly being oriented below a set angle.

\* \* \* \* \*